US006638433B2

(12) United States Patent
Watters et al.

(10) Patent No.: US 6,638,433 B2
(45) Date of Patent: Oct. 28, 2003

(54) SYSTEM AND METHOD FOR CONTROLLING WATER-ONLY CYCLONES

(75) Inventors: Larry A. Watters, Washington County, PA (US); Daniel S. Placha, Allegheny County, PA (US)

(73) Assignee: Sedgman, LLC, Pittsburgh, PA (US)

( * ) Notice: Subject to any disclaimer, the term of this patent is extended or adjusted under 35 U.S.C. 154(b) by 22 days.

(21) Appl. No.: 10/095,644

(22) Filed: Mar. 12, 2002

(65) Prior Publication Data

US 2003/0173271 A1 Sep. 18, 2003

(51) Int. Cl.[7] ........................ B01D 21/26; B01D 21/34; B04C 11/00

(52) U.S. Cl. ....................... 210/740; 210/741; 210/744; 210/787; 210/86; 210/90; 210/104; 210/105; 210/110; 210/143; 210/258; 210/259; 210/512.1; 210/512.2; 209/726; 209/730

(58) Field of Search ................................ 209/724–734; 44/620, 621; 210/85, 86, 90, 101, 103, 104, 105, 110, 112–115, 134, 137, 143, 512.1, 512.2, 258, 259, 260, 262, 787, 788, 740, 744, 741

(56) References Cited

U.S. PATENT DOCUMENTS

| | | | | |
|---|---|---|---|---|
| 2,817,441 | A | | 12/1957 | Leeman et al. |
| 4,082,368 | A | * | 4/1978 | Funk |
| 4,470,901 | A | * | 9/1984 | Burgess |

* cited by examiner

*Primary Examiner*—Terry K. Cecil
(74) *Attorney, Agent, or Firm*—Buchanan Ingersoll, P.C.

(57) ABSTRACT

A system for controlling the operation and performance of water-only cyclones used in coal preparation plants for separating a fine raw coal slurry into fine coal and fine refuse slurries includes a variable speed pump for feeding the slurry from an underpan of a deslime screen to a water-only cyclone. A nuclear density gauge measures the specific gravity of the slurry feeding the cyclones and generates a signal used to control the addition of water. A level sensor measures the level of the fine raw coal slurry in the underpan. A pressure sensor measures the pressure of the fine raw coal slurry pumped to the water-only cyclone. A speed control device uses signals from the level and pressure sensors to control the speed of the pump in order to maintain an appropriate level of slurry in the underpan, and an appropriate feed pressure to the water-only cyclone.

20 Claims, 1 Drawing Sheet

SYSTEM AND METHOD FOR CONTROLLING WATER-ONLY CYCLONES

FIELD OF THE INVENTION

The present invention is directed generally toward coal preparation plants and, more particularly, toward a system and method for monitoring and controlling the feed and operating parameters of water-only cyclones to improve cyclone performance.

BACKGROUND OF THE INVENTION

Coal preparation plants separate organic and non-organic solid particles by their specific gravities. A feed of raw mined coal is input to the coal preparation plant, which separates the raw mined coal into clean coal and refuse. Coal preparation plants typically utilize two basic processing methods for separating coal from rock and varying proportions of striated rock in the coal from the higher quality coal. These two processing methods include heavy media and water based separation methods. Heavy media separation is the most common separation process for larger sized particles, whereas water based separation processes are more commonly utilized for the finer sized particles. Water based separation methods depend exclusively on increased gravitational forces, slurry velocity and cyclone geometry. Water-only cyclones and spirals are typically utilized in coal preparation plants for separating the finer sized raw coal particles. Ultrafines are conventionally either cleaned in froth flotation or discarded.

Water-only cyclones include a cylinder with a truncated cone bottom. Gravitational forces are developed in the cyclone from the pressurized feed slurry fed near tangentially into the feed inlet with discharges at the top and bottom of the cyclone. The truncated cone allows a refuse bed to form. A relatively long vortex finder siphons the lighter clean coal particles. Water-only cyclones include various process inefficiencies, and therefore are not typically utilized as a single stage device in coal preparation plants for processing the finer sized raw coal particles. These process inefficiencies result in either clean coal being erroneously misplaced as refuse, or refuse being erroneously misplaced as clean coal. The water-only cyclone inefficiencies are typically associated with changes in the tonnage of feed solids reporting to the water-cyclone as a result of changes in the percent feed solids by weight and/or feed solid washabilities (e.g., the percentage of either high specific gravity rock and/or near gravity middlings in the raw coal feed), commonly referred to as head ash.

The present invention is directed toward overcoming one or more of the above-mentioned problems.

SUMMARY OF THE INVENTION

A system is provided for controlling the operation and performance of water-only cyclones used in coal preparation plants for separating a fine raw coal slurry into fine clean coal and fine refuse slurries. The inventive system includes a variable speed pump feeding the fine raw coal slurry from either a sump or the underpan of a deslime screen to a water-only cyclone. A level sensor measures the level of the fine raw coal slurry in the sump or underpan and generates a signal representative of the measured level value. A pressure sensor measures the pressure of the fine raw coal slurry at the water-only cyclone inlet and generates a signal representative of the measured pressure value. A speed control device is also provided which receives the level and pressure sensor signals, and controls the speed of the variable speed pump in response thereto. For instance, if the level of the fine raw coal slurry in the underpan rises too high, the speed control device is responsive to the level sensor signal to increase the speed of the variable speed pump to lower the slurry level. Conversely, if the level of the fine raw coal slurry in the underpan falls too low, the speed control device is responsive to the level sensor signal to decreases the speed of the variable speed pump to raise the slurry level.

Adjustments in pump speed will also directly affect the pressure at the inlet of the water-only cyclones. The pump speed will be adjusted to maintain the pressure within a defined range limit. If maintaining underpan levels exceeds the maximum pressure limit, the plant feed tonnage will be manually reduced.

The inventive system also includes a nuclear density gauge measuring the specific gravity of the fine raw coal slurry pumped to the water-only cyclone. The nuclear density gauge generates a signal relative to the measured specific gravity of the slurry. A makeup water control valve receives the signal from the nuclear density gauge control system to adjust the addition of water to the fine coal slurry maintaining a set point specific gravity of the fine raw coal slurry. The water may be introduced into the fine raw coal slurry by either adding the water to the raw coal feed at the feedbox, along the deslime screen, or inputting the water to the fine raw coal slurry at a location proximate a suction of the variable speed pump.

If more than one water-only cyclone is utilized by the coal preparation plant, a distributor is provided which receives the fine raw coal slurry from the variable speed pump and separates the fine raw coal slurry into an appropriate number of feed slurry portions. The pressure sensor is provided at the distributor to measure the pressure of the appropriate number of feed slurry portions, and the signal generated by the pressure sensor is reflective of the pressure value.

Using the inventive assembly, the feed pressure to the water-only cyclone is monitored, and the specific gravity of the slurry is controlled. Also, the level of the slurry in the sump or underpan is controlled so that the level does not overflow as a result of controlling the feed pressure and/or the specific gravity.

A method according to the present invention is also provided for controlling the performance of water-only cyclones. The inventive method includes the steps of measuring the level of the fine raw coal slurry in the sump or underpan, measuring the pressure of the fine raw coal slurry pumped to the water-only cyclone, and controlling the speed of the variable speed pump in response to the measured level and pressure values.

The inventive method further includes the step of maintaining a select specific gravity of the fine raw coal slurry pumped to the water-only cyclone. The select specific gravity is maintained by adding water to the fine raw coal slurry to dilute the slurry in response to the measured specific gravity value. The water may be introduced into the fine raw coal slurry by either adding the water to the raw coal feed as the raw coal feed is fed to or along the deslime screen, or inputting the water to the fine raw coal slurry at a location proximate a suction head of the variable speed pump.

It is an object of the present invention to:

- improve water-only cyclone operation and performance; and
- control the feed and operating parameters of a water-only cyclone to improve cyclone performance.

Other objects, aspects and advantages of the present invention can be obtained from a study of the specification, the drawings, and the appended claims.

DETAILED DESCRIPTION OF THE INVENTION

Figure 1:
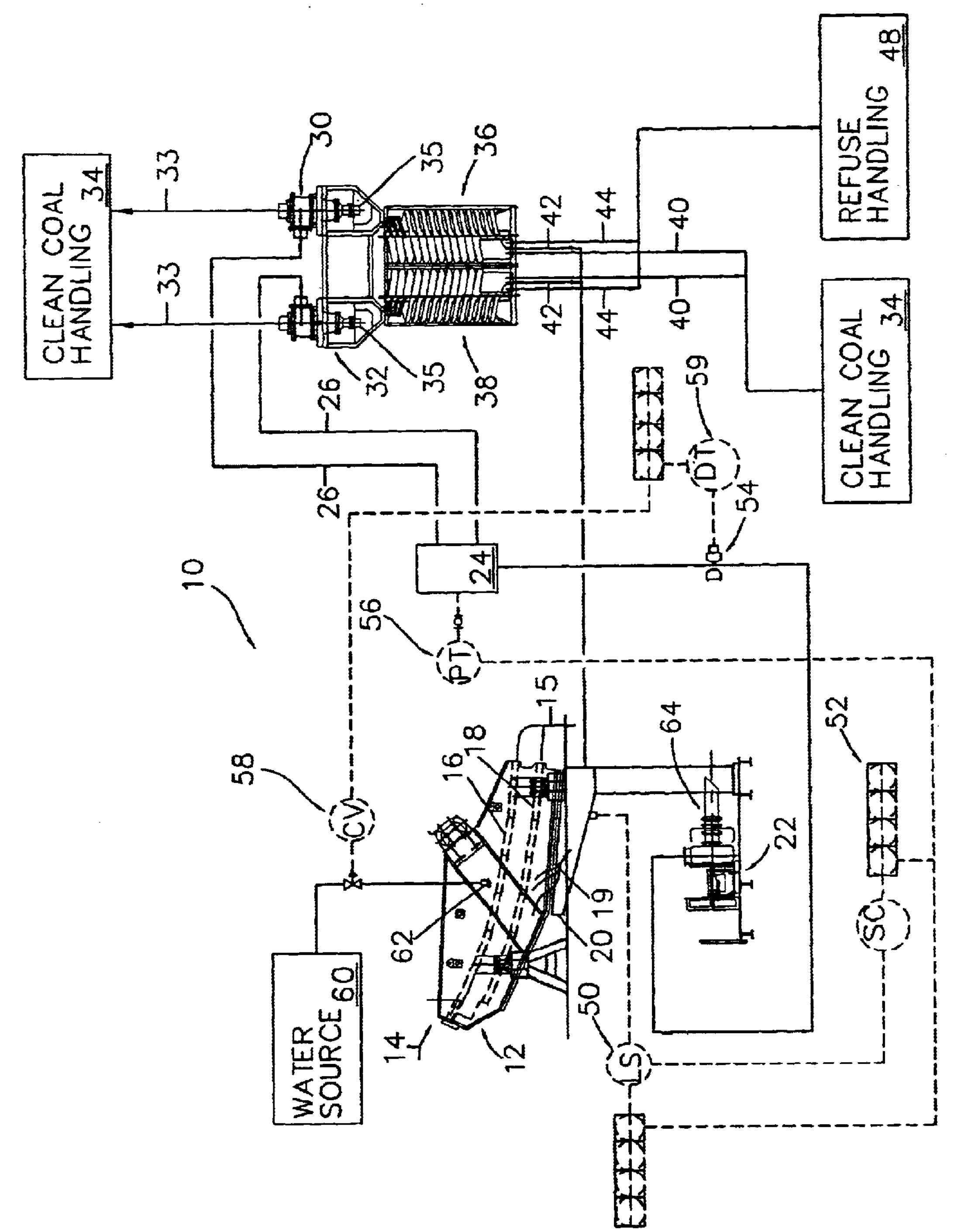
FIG. 1 is a partial block diagram of a system for monitoring and controlling water-only cyclones according to the present invention.

Referring to FIG. 1, a system for monitoring and controlling water-only cyclone operation is illustrated along with other components of a coal preparation plant, shown generally at 10. In order to better understand the inventive system and method, the general operation of the coal preparation plant 10 when processing the finer sized raw coal particles ill first be described.

The coal preparation plant 10 includes a deslime screen assembly 12 receiving a raw coal feed 14 which includes both clean coal and refuse. The deslime screen 12 conventionally separates the raw coal feed into coarse and finer sized coal fractions. The coarse coal fraction 15, which is collected from screens 16 and 18 of the deslime screen assembly 12, are fed to the coarse coal processing section (not shown) of the coal preparation plant 10 for conventional processing. The finer sized coal fraction 19 is received in an underpan 20 of the deslime screen assembly 12. While not specifically shown in FIG. 1, the raw coal feed 14 is pre-wetted with water prior to being received on the deslime screen assembly 12. Accordingly, the underpan 20 of the deslime screen assembly 12 receives a slurry of water and the finer sized raw coal particles 19. The slurry of water and the finer sized raw coal particles 19 is pumped from the underpan 20 by a variable speed pump 22 to a distributor 24.

The distributor 24 equally divides the fine raw coal slurry 19 into the inlets of conventional water-only cyclones 30 and 32, respectively. The water-only cyclones 30 and 32 conventionally process the fine raw coal slurry portions 26, separating them into clean coal slurries 33, which are fed to a conventional fine clean coal processing section 34 of the coal preparation plant 10, and reject slurries 35.

The reject slurries 35 produced by the water-only cyclones 30 and 32 are received by conventional coal spirals 36 and 38, respectively. The coal spirals 36 and 38 are preferably triple-start spirals, and each conventionally separates the reject slurry 35 into different fractions of clean coal 40, middlings 42 and refuse 44. The clean coal fraction 40 is fed to the conventional clean coal processing section 34, while the refuse fraction 44 is fed to a conventional refuse handling section 48. As shown in FIG. 1, the middlings fraction 42 is fed back to the underpan 20 of the deslime screen assembly 12 and combined with the fine raw coal slurry 19. However, depending upon the separation desired, the clean coal fraction 40 may be combined with the middlings fraction 42, and both fractions fed back to the underpan 20 of the deslime screen assembly 12.

It should be understood that while the water-only cyclones 30 and 32 and the coal spirals 36 and 38 are shown as incorporating a combined underpan and feedbox and maybe considered as integrally formed, the water-only cyclones 30, 32 may be entirely separate from the coal spirals 36, 38 without departing from the spirit and scope of the present invention.

Due to various operating parameter changes in the coal preparation plant 10, the water-only cyclones 30 and 32 may develop process inefficiencies, resulting in the cyclones 30, 32 classifying clean coal as refuse, and vice versa. In order to overcome these process inefficiencies, the system of the present invention has been provided to monitor and control the feed and operating parameters of the water-only cyclones 30, 32 to improve cyclone performance.

The inventive system includes a level sensor 50 for measuring the level of the fine raw coal slurry 19 in the underpan 20, a speed control 52 for controlling the speed of the variable speed pump 22, a nuclear density gauge 54 measuring the specific gravity of the fine raw coal feed slurry 19, and a pressure transmitter, or sensor, 56 for measuring the pressure of the fine raw coal slurry portions 26 fed to the inputs of the water-only cyclone 30 and 32. The inventive system is designed to monitor and correct changes in operating parameters that may affect water-only cyclone performance.

The nuclear density gauge 54 measures the specific gravity of the fine raw coal feed slurry 19 pumped from the underpan 20, and as part of an integrated control system controls the specific gravity of the fine raw coal feed slurry 19 by the addition of water thereto. Preferably, the nuclear density gauge is positioned between the variable speed pump 22 and the distributor 24. The nuclear density gauge 54 operates a control valve 58, via control circuitry 59, which is connected to a water source 60 to add water to the fine raw coal feed slurry 19 in accordance with the measured specific gravity value. For example, if the specific gravity value measured by the nuclear density gauge 54 is too high, the valve 58 will open to allow the addition of water from the water source 60 to the fine raw coal feed slurry 19 to lower its specific gravity. As shown in FIG. 1, the water from the water source 60 is fed to the raw coal feed 14 and/or applied along the length of the deslime screen 12 by a sprayer 62. The water added aids in removing the finer raw coal particles from the raw coal feed 14, and the sprayed-on water and finer raw coal particles pass through the screens 16 and 18 and are received in the underpan 20. However, for a more controlled dilution of the fine raw coal feed slurry 19, the water may be input at a suction of the variable speed pump 22, shown generally at 64.

With the addition of water to the raw coal feed slurry 19, the level of the raw coal feed slurry 19 in the underpan 20 may rise to an undesirable level, causing the underpan 20 to overflow. Accordingly, the level sensor 50 is provided to help ensure that no such overflow occurs. The level sensor 50 monitors the level of the slurry 19 in the underpan 20 and generates a signal indicative of the measured level value. The speed control 52 receives the level signal and controls the speed of the variable speed pump 22 in response thereto to maintain an appropriate level of slurry 19 in the underpan 20. If the level of slurry 19 in the underpan 20 rises too high, the speed control 52 responds to the level signal from the level sensor 50 to increase the speed of the variable speed pump 22 and thus alleviate the rising level of slurry 19 in the underpan 20. The level sensor 50 ensures that no overflow of the underpan 20 occurs. Similarly, if the level of slurry 19 in the underpan 20 falls too low, the speed control 52 responds to the level signal from the level sensor 50 to decrease the speed of the variable speed pump 22 to counteract the falling slurry level.

Since the pressure of the input feed to the water-only cyclones 30 and 32 also effects cyclone performance, the pressure transducer 56 monitors the pressure of the fine raw coal slurry portions at the distributor 24. In response to signals received by the pressure transducer 56, the speed control 52 either increases or decreases the speed of the variable speed pump 22 which correspondingly increases or decreases the feed pressure, respectively, in order to maintain the pressure of the water-only cyclone input feeds within a desired operating range associated with the particular water-only cyclones used.

By monitoring and controlling the feed and other operating parameters of the water-only cyclones 30, 32, the inventive system improves the overall performance of the water-only cyclones 30 and 32. The speed control 52 of the variable speed pump 22 helps to maintain a desired level in the underpan 20 and a desired pressure of the input feeds to the water-only cyclones 30 and 32. The nuclear density gauge 54 and control valve combination helps to maintain a desired specific gravity of the slurry fed to the water-only cyclones 30 and 32. The simulanteous use of these control features helps to improve the overall performance of the water-only cyclones 30 and 32.

While the present invention has been described with particular reference to the drawings, it should be understood that various modifications could be made without departing from the spirit and scope of the present invention. For instance, while two water-only cyclones 30 and 32 are illustrated in FIG. 1, one, two, three or more water-only cyclones may be utilized without departing from the spirit and scope of the present invention. Still further, while the inventive system has been shown and described herein as used in a coal preparation plant 10 the inventive system may be utilized in preparation plants for ore and minerals other than coal without departing from the spirit and scope of the present invention.

We claim:

1. In a mineral preparation plant receiving a raw mineral feed and separating the raw mineral feed into coarse and fine sized raw mineral fractions, the fine sized raw mineral fraction received as a fine raw mineral slurry at an underpan of a deslime screen and pumped from the underpan to a water-only cyclone for processing, a system for controlling water-only cyclone performance, said system comprising:

- a variable speed pump feeding the fine raw mineral slurry from the underpan to the water-only cyclone;
- a level sensor measuring a level of the fine raw mineral slurry in the underpan and generating a signal indicative of the measured level value;
- a pressure sensor measuring a pressure of the fine raw mineral slurry pumped to the water-only cyclone and generating a signal indicative of the measured pressure value; and
- a speed control receiving the level and pressure sensor signals and controlling the speed of the variable speed pump in response thereto.

2. The system of claim 1, further comprising a nuclear density gauge and control system measuring the specific gravity of the fine raw mineral slurry pumped to the water-only cyclone and configured to add water to the fine raw mineral slurry to control the specific gravity of the fine raw mineral slurry.

3. The system of claim 2, further comprising at least one valve connected to a water source, wherein the nuclear density gauge and control system controls at least one valve to add water to the fine raw mineral slurry based upon the measured specific gravity value by the nuclear density gauge.

4. The system of claim 3, wherein the water added to the fine raw mineral slurry is fed to the raw mineral feed, or sprayed as the raw mineral feed is fed along the deslime screen.

5. The system of claim 3, wherein the water added to the fine raw mineral slurry is input proximate a suction of the variable speed pump.

6. The system of claim 1, wherein the mineral comprises coal.

7. The system of claim 1, further comprising a distributor receiving the fine raw mineral slurry from the variable speed pump and separating the fine raw mineral slurry into at least two feed slurry portions for at least two water-only cyclones, wherein the pressure sensor measures the pressure of the at least two feed slurry portions, wherein the signal generated by the pressure sensor is indicative of the measured pressure value.

8. The system of claim 2, wherein the nuclear density gauge is disposed between the variable speed pump and the water-only cyclone.

9. In a mineral preparation plant receiving a raw mineral feed and separating the raw mineral feed into coarse and fine sized raw mineral fractions, the fine sized raw mineral fraction received as a fine raw mineral slurry at an underpan of a deslime screen and pumped from the underpan to a water-only cyclone for processing, a system for controlling water-only cyclone performance, said system comprising:

- a variable speed pump pumping the fine raw mineral slurry from the underpan to the water-only cyclone;
- a nuclear density gauge and control system measuring a specific gravity of the fine raw mineral slurry pumped to the water-only cyclone and configured to add water to the fine raw mineral slurry to control the specific gravity of the fine raw mineral slurry;
- a level sensor measuring a level of the fine raw mineral slurry in the underpan and generating a signal indicative of the measured level value; and
- a speed control receiving the level sensor signal and controlling the speed of the variable speed pump in response thereto.

10. The system of claim 9, further comprising at least one valve connected to a water source, wherein the nuclear density gauge and control system adjusts at least one valve to add water to the fine raw mineral slurry based upon the measured specific gravity value by the nuclear density gauge.

11. The system of claim 10, wherein the water added to the fine raw mineral slurry is added as the raw mineral feed is fed along the deslime screen.

12. The system of claim 10, wherein the water added to the fine raw mineral slurry is input proximate a suction of the variable speed pump.

13. The system of claim 9, wherein the mineral comprises coal.

14. The system of claim 9, wherein the nuclear density gauge is disposed between the variable speed pump and the water-only cyclone.

15. In a mineral preparation plant receiving a raw mineral feed and separating the raw mineral feed into coarse and fine sized raw mineral fractions, the fine sized raw mineral fraction received as a fine raw mineral slurry at an underpan of a deslime screen and pumped, by a variable speed pump, from the underpan to a water-only cyclone for processing, a method for controlling water-only cyclone performance, said method comprising the steps of:

- measuring a level of the fine raw mineral slurry in the underpan;
- measuring a pressure of the fine raw mineral slurry pumped to the water-only cyclone; and
- controlling the speed of the variable speed pump in response to the measured level and pressure values.

16. The method of claim 15, further comprising the step of maintaining a select specific gravity of the fine raw mineral slurry pumped to the water-only cyclone.

17. The method of claim 16, wherein the maintaining step comprises the steps of:

measuring a specific gravity of the fine raw mineral slurry pumped to the water-only cyclone; and adding water to the fine raw mineral slurry to dilute the slurry in response to the measured specific gravity value.

18. The method of claim 17, wherein the adding step comprises the step of spraying water, in response to the measured specific gravity value, onto the raw mineral feed as the raw mineral feed is fed along the deslime screen.

19. The method of claim 17, wherein the adding step comprises the step of inputting water, in response to the measured specific gravity value, to the fine raw mineral slurry at a location proximate a suction of the variable speed pump.

20. The method of claim 15, wherein the mineral comprises coal.

* * * * *